United States Patent
Kazuo et al.

(10) Patent No.: US 6,749,223 B2
(45) Date of Patent: *Jun. 15, 2004

(54) SEAT BELT GUIDE

(75) Inventors: Yoshino Kazuo, Toyota (JP); Hirako Yutaka, Okazaki (JP)

(73) Assignee: Nifco Inc., Yokohama (JP)

( * ) Notice: Subject to any disclaimer, the term of this patent is extended or adjusted under 35 U.S.C. 154(b) by 11 days.

This patent is subject to a terminal disclaimer.

(21) Appl. No.: 10/201,783

(22) Filed: Jul. 25, 2002

(65) Prior Publication Data

US 2003/0020272 A1 Jan. 30, 2003

(30) Foreign Application Priority Data

Jul. 30, 2001 (JP) ........................................ 2001-230615

(51) Int. Cl.[7] .............................................. B60R 22/00
(52) U.S. Cl. ..................... 280/801.1; 280/727; 297/483
(58) Field of Search .......................... 280/801.1, 727; 297/483, 473, 481

(56) References Cited

U.S. PATENT DOCUMENTS

| | | | | |
|---|---|---|---|---|
| 3,521,901 A | * | 7/1970 | Waxkym | .................... 280/150 |
| 3,995,885 A | * | 12/1976 | Plesniarski | .................. 280/747 |
| 4,159,848 A | * | 7/1979 | Manz et al. | ................. 297/474 |
| 4,236,755 A | * | 12/1980 | Pollitt et al. | ................ 297/483 |
| 4,289,352 A | * | 9/1981 | Ashworth | .................... 297/473 |
| 4,431,233 A | * | 2/1984 | Ernst | ........................... 297/468 |
| 4,518,174 A | * | 5/1985 | Sedlmayr | .................... 280/808 |
| 5,443,302 A | * | 8/1995 | Dybro | ......................... 297/471 |
| 5,476,286 A | * | 12/1995 | Delfino | .................... 280/801.2 |
| 5,609,367 A | * | 3/1997 | Eusebi et al. | ............... 280/808 |
| 5,730,499 A | * | 3/1998 | Salisbury, Jr. | .............. 297/473 |
| 6,276,720 B1 | * | 8/2001 | Saito et al. | ............. 280/801.2 |
| 6,474,691 B2 | * | 11/2002 | Izume et al. | ............. 280/801.1 |
| 6,520,588 B1 | * | 2/2003 | Busch | ........................ 297/483 |

* cited by examiner

*Primary Examiner*—Christopher P. Ellis
*Assistant Examiner*—Rashmi Sharma
(74) *Attorney, Agent, or Firm*—Kanesaka & Takeuchi

(57) ABSTRACT

A seat belt guide includes a main portion formed of a lower cover and an upper cover, a slide portion of a hanger is inserted into a hanger guide portion to slide in the front and rear directions of the hanger guide portion. Thus, guide positions of a seat belt can be changed. In the main portion, there is provided a spacer with upper flange and lower flanges, which is inserted into a slide hole of the slide portion, so that the slide portion is disposed between the upper and the lower flanges, and the hanger can be slid.

5 Claims, 12 Drawing Sheets

SEAT BELT GUIDE

BACKGROUND OF THE INVENTION AND RELATED ART STATEMENT

The invention relates to a seat belt guide for guiding a seat belt disposed to a rear seat, more particularly, a seat belt guide capable of adjusting an attaching position of a seat belt by changing a guide position of the seat belt.

A seat belt guide for guiding a seat belt applied around the shoulder of a passenger fed from a retractor located on the backside of a seat is provided to a rear seat of a passenger car. Heretofore, in the seat belt guide, since a position for guiding the seat belt is fixed, when a small passenger, such as an old person, wears the seat belt, the position of the seat belt attached to the upper half of the body relatively deviates upward, so that the seat belt can not be attached to a proper position.

On the other hand, in order to solve the above defects, a seat belt guide capable of adjusting the attaching position of the seat belt according to physical features of a passenger has been proposed by the present applicant (refer to Japanese Patent Application 2000-185893).

In a seat belt guide 100 shown in FIG. 13, a hanger 106 sliding in the front and rear directions, i.e. in the arrow F-R directions in the drawing, is disposed on the front surface side of a main portion formed of an upper cover 102 and a lower cover 104. A seat belt (not shown) is inserted into a belt insertion hole 110 of a guide portion 108 formed at a front end of the hanger 106 and a guide position is moved in the front and rear directions, so that the attaching position of the seat belt can be adjusted.

Also, the hanger 106 has a structure such that a slide portion 112 is inserted into a hanger guide portion 114 formed of the upper cover 102 and the lower cover 104, and is slidably supported by a mechanism including a shoulder bolt 118 inserted into a slide hole 116, a push nut (washer) 120, a spring 122 disposed on a lower side of the slide portion 112, a metal spacer 124 around which the spring 122 is fitted, a spring guide (upper) 126 and a spring guide (lower) 128. Thus, the slide portion 112 can be moved in the front and rear directions of the slide hole 116.

Further, in the seat belt guide 100, when the hanger 106 is drawn forward, the side of a guide portion 108 is urged in an arrow A direction (in a direction of a compartment side) by a force of the spring 122, so that even if the seat belt is, for example, strongly pulled, the hanger 106 is swung to a side opposite to the urging direction to thereby relieve the impact and prevent a damage from taking place.

However, in the seat belt guide 100 as described above, since there are used many parts, such as an exclusive shoulder bolt 118, push nut 120, spacer 124, spring guide (upper) 126 and spring guide (lower) 128, for a supporting mechanism for guiding the hanger 106, the cost becomes high and its assembling work becomes complicated.

Also, since the upper cover 102 and the lower cover 104 have a structure fixed by a screw 130, its workability is not good.

In view of the above defects, the present invention has been made and an object of the invention is to provide a seat belt guide, wherein the number of parts of a mechanism capable of adjusting an attaching position of a seat belt can be reduced to thereby decrease its cost and, at the same time, its assembling workability can be improved.

Further objects and advantages of the invention will be apparent from the following description of the invention.

SUMMARY OF THE INVENTION

According to the first aspect of the invention, a seat belt guide guides a seat belt fed from a retractor disposed on a rear side of a seat and attached obliquely across an upper half of a body of a passenger sitting on the seat near the shoulder of the passenger, and has a moving device for moving a guide position in front and rear directions of the seat. The seat belt guide includes a slide hole provided to the moving device and extending in its moving direction; a supporting pole fixed to the seat in a state inserted into the slide hole; and a plurality of flanges integrally formed with the supporting pole to act as a stopper with respect to the slide hole.

In the invention according to the first aspect, the seat belt fed from the rear side of the seat is attached obliquely across the upper half of the body of the passenger sitting on the seat in a state where only one side of passenger's shoulders is girded. From the state, when the guide position for guiding an upper end side of the attaching portion of the seat belt is shifted to the front side of the seat by the moving device provided to the seat belt guide, an angle of the seat belt attached to the upper half of the body becomes shallower than that in the ordinary case on the upper end side of the attaching portion of the seat belt, so that an overlapping amount to the body is decreased. Thus, the tightening force of the seat belt becomes weak or is released at the upper portion of the upper half of the body, i.e. near the shoulder, so that the seat belt is attached on the side of the abdominal region with the breast as a center.

Therefore, even if a smaller passenger wears the seat belt, there is no case that the seat belt is wound around the upper portion of the upper half of the body, so that without relatively changing the attaching height of the seat belt, the seat belt can be properly attached.

Also, the moving device can slide along the slide hole under the guide of the flanges of the supporting pole acting as a stopper which is inserted into the slide hole. As described above, since the supporting pole integrally formed with the flanges guides and supports the moving device, the spacer and a plurality of guide members used in the conventional seat belt guide are not required. Thus, the mechanism of the moving device can be simplified to thereby reduce the number of parts, which results in a cheap cost and improved assembling workability.

In the invention according to the second aspect, the supporting pole in the seat belt guide according to the first aspect has a cylindrical shape, which is fixed to the seat by a tapping screw.

In the invention according to the second aspect, since the supporting pole has the cylindrical shape, the supporting pole can be fixed by a screw member, such as a normal tapping screw, instead of a conventional expensive shoulder bolt. Thus, the cost can be reduced.

In the invention according to the third aspect, at least one of the flanges located on both sides of the slide hole has a width smaller than a hole width of the slide hole in the seat belt guide according to the first aspect.

In the invention according to the third aspect, when the supporting pole is assembled to the slide hole of the moving device, since the width of the flange is smaller than the hole width of the slide hole, the supporting pole can be easily assembled to the slide hole by inserting the flange into the slide hole.

In the invention according to the fourth aspect, in the seat belt guide according to the first aspect, a main portion of the seat belt guide is formed of separated two cover members, one of the cover members includes an engaging portion integrally formed therewith, and the other cover member includes a portion integrally formed therewith to be engaged by the engaging portion in a state where both cover members are assembled.

In the invention according to the fourth aspect, when the two cover members constituting the main portion of the seat belt guide are assembled, the engaging portion integrally formed with one of the cover members engages the portion to be engaged formed integrally with the other cover member to thereby fix. Thus, the assembling work of both cover members can be simplified.

BRIEF DESCRIPTION OF THE DRAWINGS

FIGS. 4(A)–4(D) are explanatory views of a structure of a seat belt guide portion of the seat belt guide as shown in FIG. 2, wherein FIG. 4(A) shows a state right after molding of the guide portion; FIG. 4(B) is a sectional view taken along line 4B—4B in FIG. 4(A); FIG. 4(C) shows an assembling state of the guide portion; and FIG. 4(D) is a sectional view taken along line 4D—4D in FIG. 4(C);

DETAILED DESCRIPTION OF PREFERRED EMBODIMENTS

Hereunder, an embodiment according to the present invention will be explained with reference to the accompanying drawings.

Figure 1:
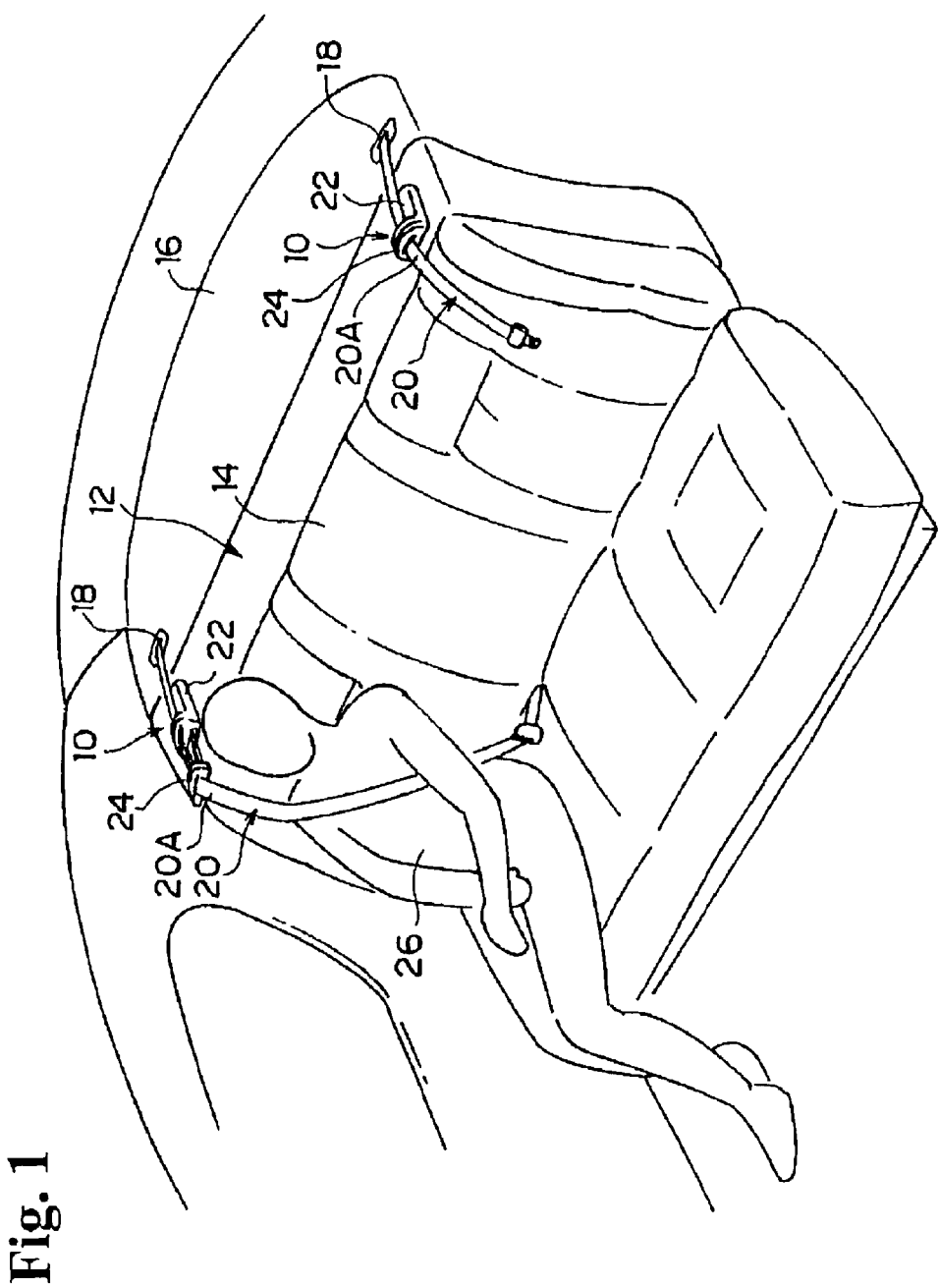
FIG. 1 is a perspective view showing a state where a small passenger wears a seat belt to which a seat belt guide of an embodiment according to the invention is applied.

In FIG. 1, a rear seat and its surrounding of a motor car to which a seat belt guide of an embodiment according to the present invention is applied are shown. As shown in the drawing, a seat belt guide 10 is attached to an upper portion of a seat back 14 of a rear seat 12 to guide an upper end portion 20A of a seat belt 20 taken out of an opening 18 provided to a package tray 16.

The seat belt guide 10 basically includes a main portion 22 fixed to the seat back 14 of the rear seat 12, and a hanger 24 for controlling a guide position of the seat belt 20 by being attached to the main portion 22 such that the hanger 24 is slidable in the front and rear directions of the rear seat 12 and is swingable horizontally in a forward-slid state.

FIG. 1 shows a state wherein the seat belt 20 is applied to a small passenger 26, and the seat belt guide 10 changes the guide position of the upper end portion 20A to the left direction in the drawing (to the window side in the car). Therefore, the attached height of the seat belt 20 is lowered and, at the same time, the seat belt angle wound around a shoulder portion of the passenger becomes shallow, so that the seat belt 20 can be applied to a position suitable for the small passenger 26. Hereunder, a structure of the seat belt guide 10 adjustable in the guide position of the seat belt 20 as described above will be described in detail.

Figure 2:
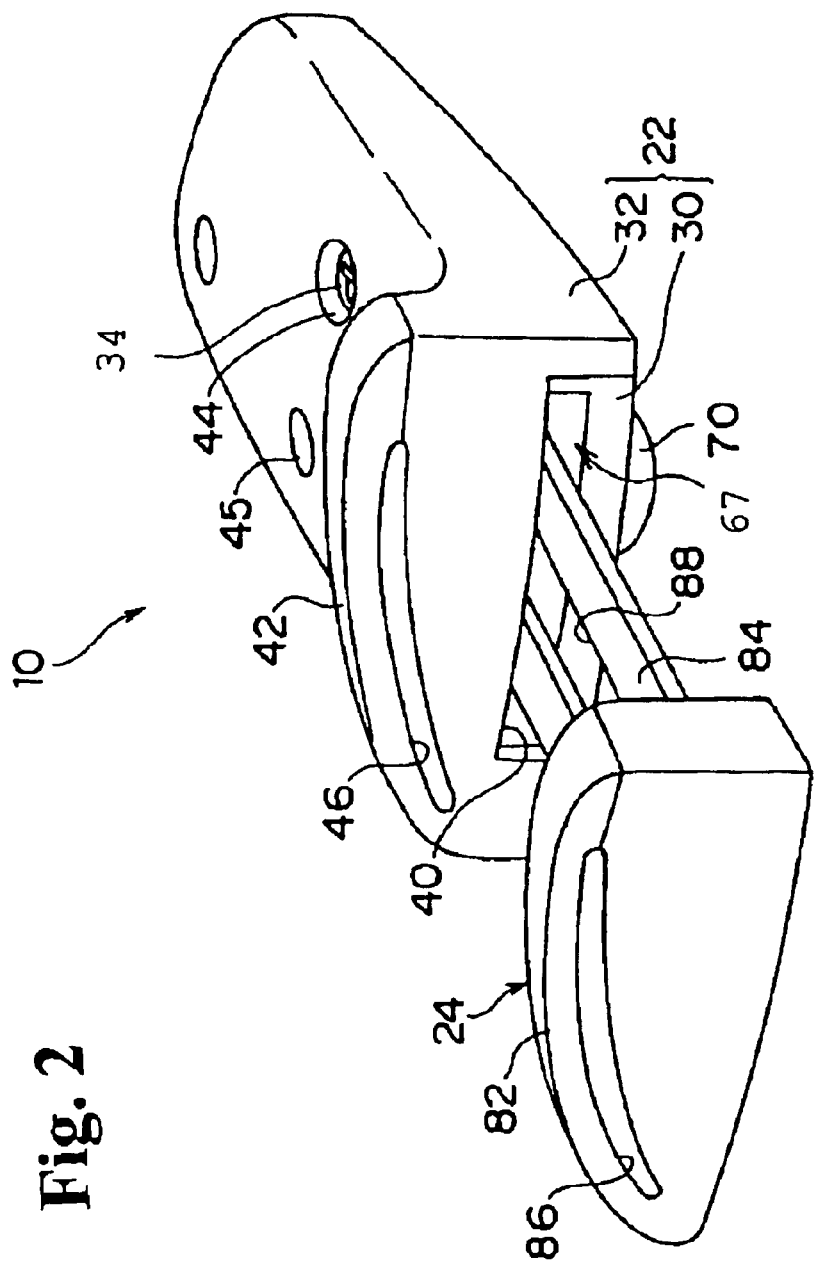
FIG. 2 is a perspective view showing a state where a hanger of the seat belt guide of the embodiment according to the invention is drawn out forward.
Figure 3:
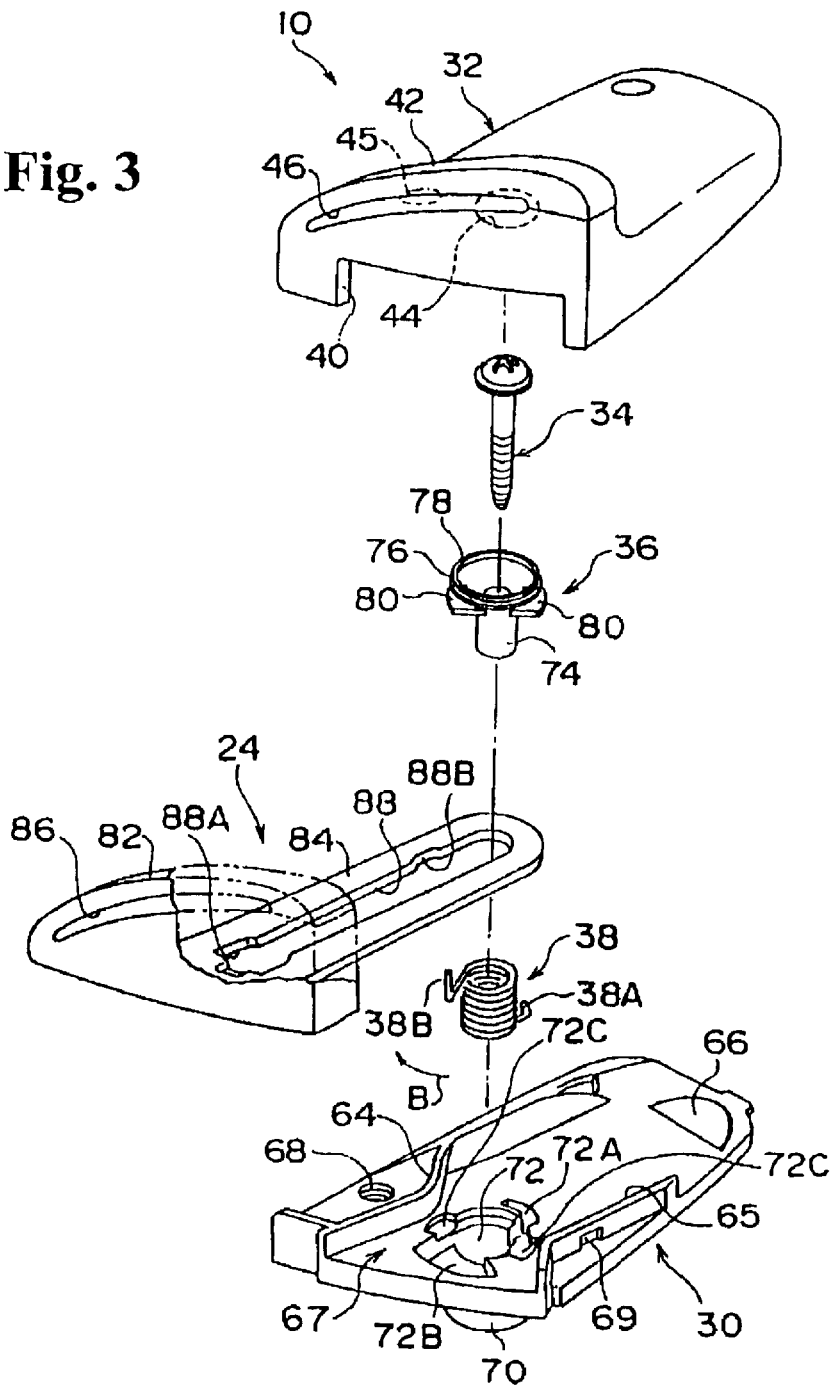
FIG. 3 is an exploded perspective view of the seat belt guide shown in FIG. 2.

FIGS. 2 and 3 show an outer perspective view and an exploded perspective view of the seat belt guide 10, respectively. As shown in the drawings, the main portion 22 has a separate structure formed of a lower cover 30 in a substantially trapezoidal flat board shape located on the lower side, and an upper cover 32 covering an upper surface to be attached to the upper surface of the lower cover 30. The main portion 22 is fixed to the seat back 14 by a tapping screw 34. Inside the main portion 22, there are incorporated a spacer 36 for supporting the hanger 24 to be slidable and swingable, and a spring 38 for urging the hanger 24 in a predetermined direction.

First, the upper cover 32 will be explained. The upper cover 32 is a polyoxymethylene (hereinafter referred to as "POM") molding, wherein a rectangular opening 40 is formed at a lower edge on the front surface, and a guide portion 42 for guiding the seat belt 20 is provided in a stand-up state at an upper portion of the front end. Also, a circular hole 44 is provided on the back side of the guide portion 42, and a box anchor 45 is disposed on the side of the circular hole 44.

The guide portion 42 includes a belt insertion hole 46 for passing the belt therethrough in the front and rear directions, which is inclined in a specific direction (in the drawing, inclined in the left side), and the seat belt 20 is inserted into the belt insertion hole 46.

Figure 4A:
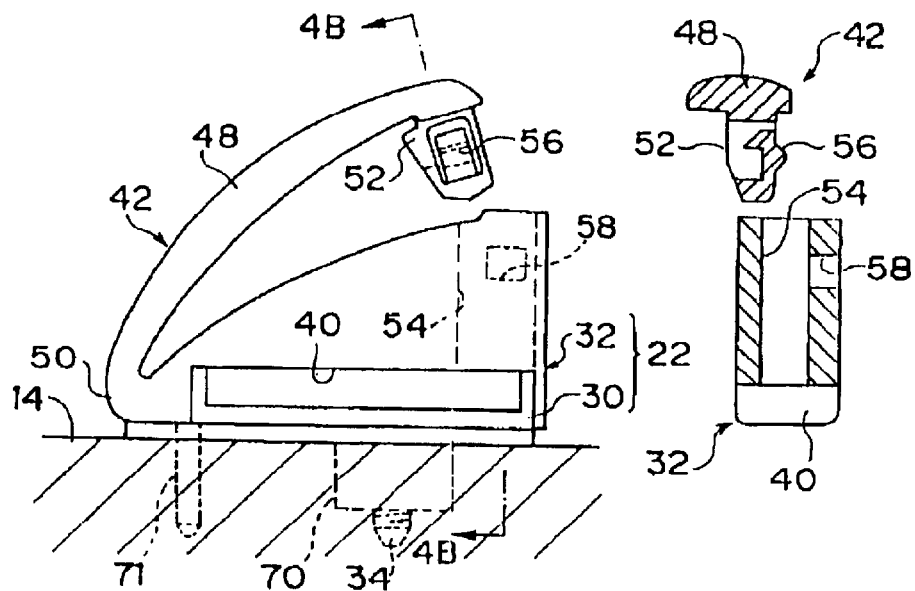
Figure 4B:
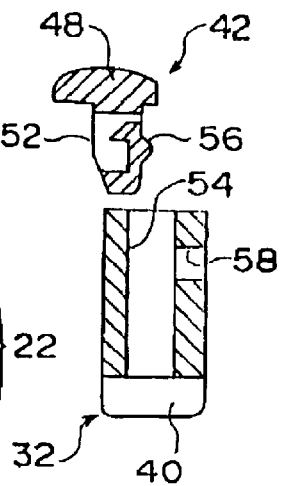
Figure 4C:
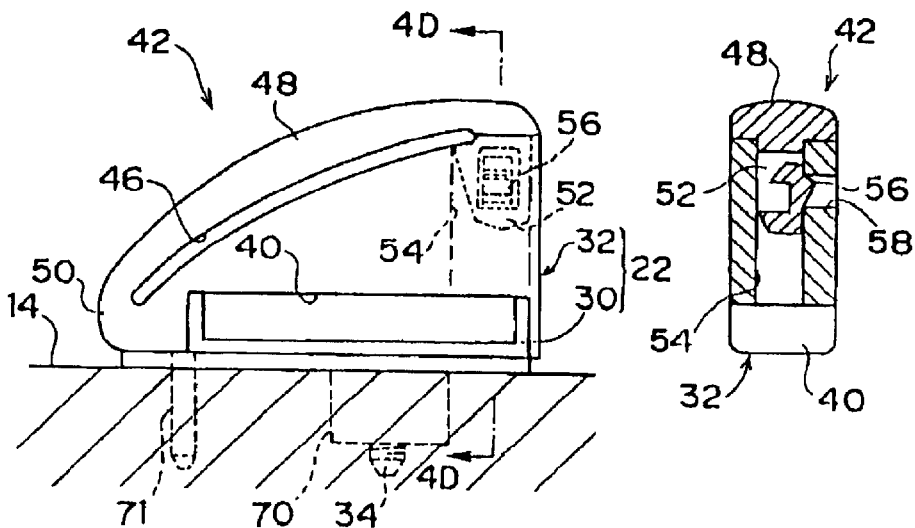
Figure 4D:
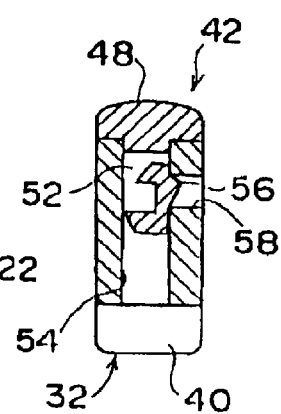

FIGS. 4(A)–4(D) show drawings for explaining the structure of the guide portion 42. FIGS. 4(A) and 4(B) show a state after the guide portion 42 is molded. As shown in the drawing, the guide portion 42 has a structure such that the belt insertion hole 46 is separated into upper and lower portions. An upper wall portion 48 constituting an upper portion of the guide portion 42 is integrated with the upper cover 32 by connecting an end portion 50 on an inclined lower side of the belt insertion hole 46 to the upper cover 32. In case a protrusion 52 provided on a lower surface side of the forward end of the upper wall portion 48 fits a through-hole 54 of the upper cover 32, an engagement claw 56 provided at the protrusion 52 is elastically deformed and engages an engagement hole 58 of the through-hole 54 to thereby lock, so that the belt hole 46 can be formed, as shown in FIGS. 4(C) and 4(D). As described above, since the guide portion 42 is separated, the seat belt 20 can be easily set into the belt insertion hole 46.

Further, as shown in FIG. 4(B), in a natural state after the molding, positions of the protrusion 52 and the through-hole 54 are deviated, i.e. the protrusion 52 is positioned forward with respect to the through hole 54. Thus, when the protrusion 52 is fitted into the through hole 54, the end portion 50 on the inclined lower side is bent or deformed so that the force is acted on the fitted portion to thereby strengthen the locking force.

Figure 5:
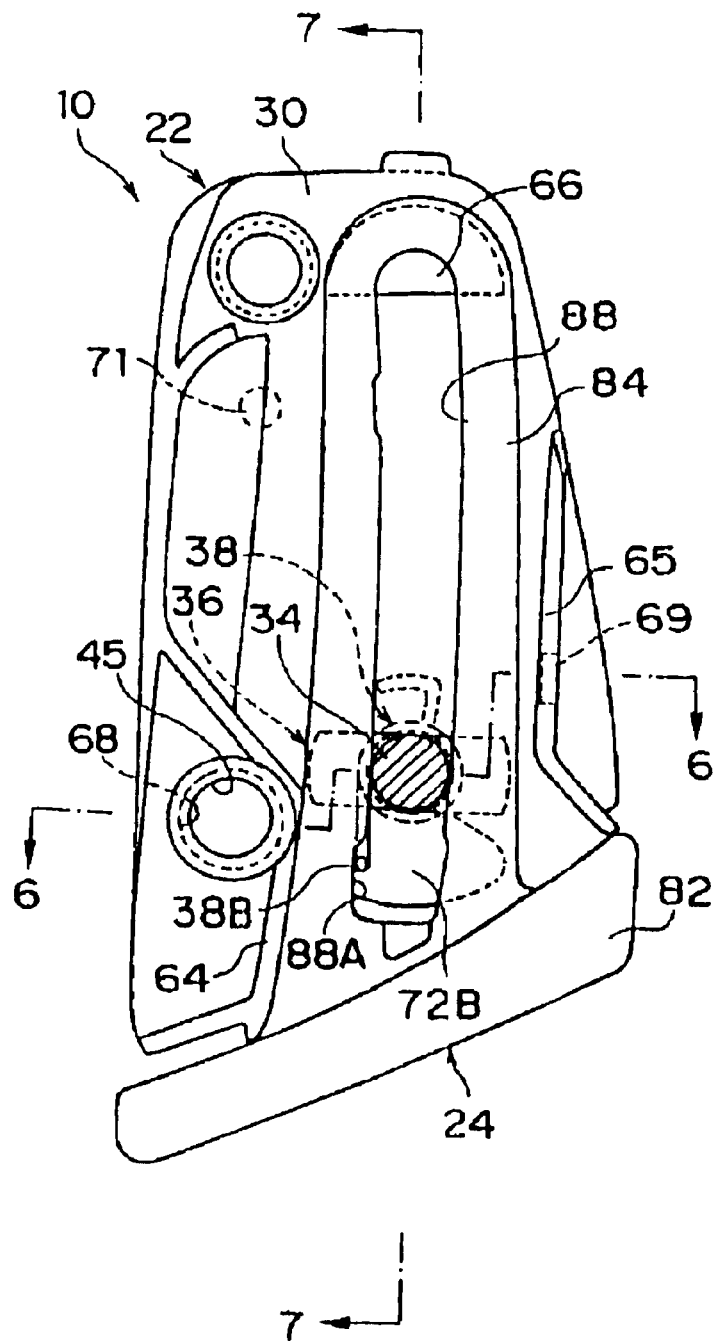
FIG. 5 is a plan sectional view showing a housed state of a hanger of the seat belt guide shown in FIG. 2.
Figure 6:
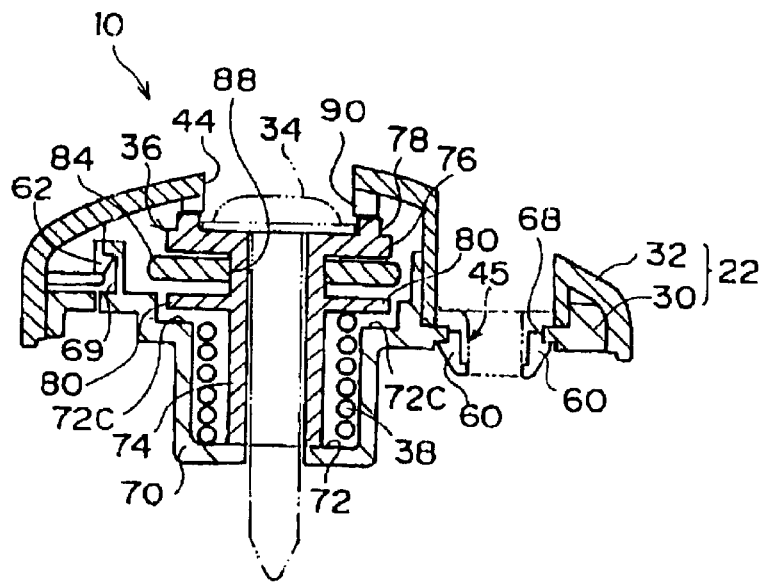
FIG. 6 is a sectional view taken along line 6—6 in FIG. 5.

The box anchor 45 has a cylindrical shape projecting downward from the upper wall portion of the upper cover 32, and a pair of claw members 60 which is elastically deformable inward is provided on a lower end side of an outer circumference, as shown in FIGS. 5 and 6. Also, a thick elastically deformable claw member 62, which projects toward the box anchor 45, is provided on an inner surface of the upper wall portion near the side end portion opposite to the box anchor 45 of the upper cover 32.

On the other hand, on the lower cover 30 molded as polyamide (hereinafter referred to as "PA") molding, wall portions 64, 65 extending in the front and rear directions to face each other are substantially symmetrically formed near the right and left ends of the upper surface, while an inclined portion 66 having a surface upwardly inclined toward the rear side is formed near the rear end of the upper surface. The wall portions 64, 65 are extended in a tapered shape on their forward side to be opened, so that in a state where the upper cover 32 is attached, inner wall surfaces of the opening portion 40 are fitted thereto. Therefore, in the assembled state as shown in FIG. 2, the hanger guide portion 67 is formed by being surrounded with the upper surface of the lower cover 30, wall portions 64, 65 and the upper cover 32 to be a tubular shape and extended into an interior of the main portion 22 with the opening portion 40 as an entrance.

Also, on the lower cover 30, there is formed a circular through-hole 68 at a position corresponding to the box anchor 45 of the upper cover 32, and a depressed portion 69 having a square opening is formed at a position corresponding to the claw member 62 on an Outer wall surface of the wall portion 65. Thus, in case the upper cover 32 is assembled to the lower cover 30, the box anchor 45 is inserted into the through-hole 68 so that the claw portions 60 are elastically contracted or expanded to engage the through-hole 68, and at the same time, the claw member 62 is also engaged with the depressed portion 69 through an elastic deformation. Thus, the upper cover 32 is fixed to the lower cover 30 (a state of FIG. 6).

Figure 7:
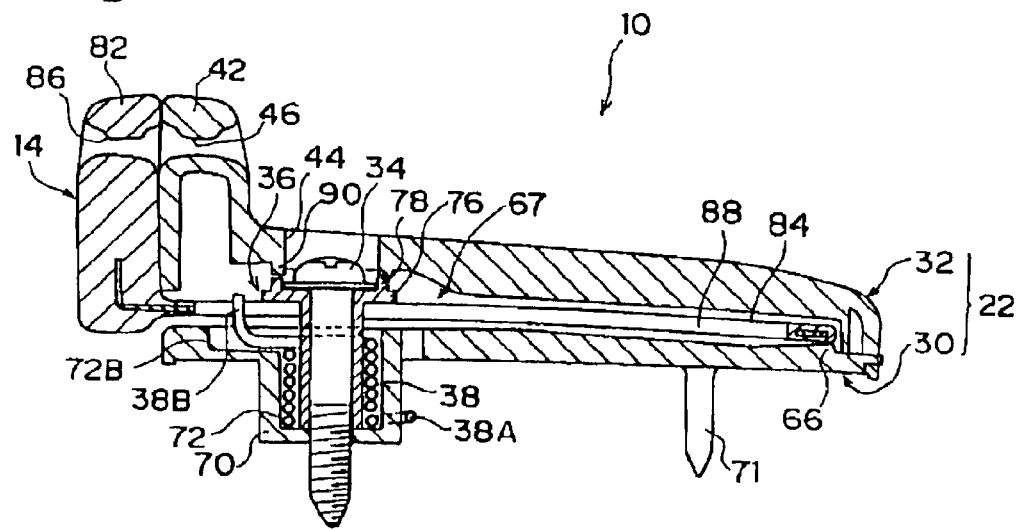
FIG. 7 is a sectional view taken along line 7—7 in FIG. 5.

Further, a substantially cylindrical boss portion 70 is disposed at a position corresponding to a circular hole 44 of the upper cover 32 near the front end portion of the lower cover 30 to project downward through the lower surface of the lower cover 30, and a positioning pin 71 integrally formed with the lower cover 30 is provided vertically downward (refer to FIGS. 5 and 7).

A spring 38 is fitted into a depressed portion 72 of the boss portion 70 as shown in FIGS. 6 and 7. The spring 38 is positioned such that a fixing end 38A thereof is fitted into a fitting groove 72A, and a movable end 38B thereof is disposed in a step portion 72B in a fan shape provided on the front side of the depressed portion 72, so that the movable end 38B can be moved in a specific area, and, under the state, a cylindrical portion 74 of a spacer 36 is inserted thereinto from the upper portion.

The spacer 36 is a PA molding, and the cylindrical portion 74 includes a circular upper flange 76 on an upper end thereof, and a rib 78 in a circular shape having a diameter smaller than that of the upper flange 76. Further, on a lower side of the upper flange 76, there are formed lower flanges 80 in a substantially rectangular shape with a specific space therebetween. The dimension of the lower flanges 80 in the longitudinal direction, i.e. an outer-diameter dimension, is made to have the same length as the diameter of the upper flange 76, while the width thereof is made to have the same size as an outer diameter of the cylindrical portion 74. Under the state wherein the spacer 36 is inserted into the spring 38, the lower flanges 80 are fitted into the step portions 72C provided on both sides of the depressed portion 72 of the boss portion 70 to thereby stop the rotation thereof.

Next, the hanger 24 will be explained. The hanger 24 is a POM molding and, in order to provide the hanger with a strength, a stainless steel (hereinafter referred to "SUS") material is inserted in the hanger. The hanger 24 includes a guide portion 82 for guiding the seat belt 20 at the front end portion thereof and a slide portion 84 extending from a back side of a lower end portion of the guide portion 82 toward the rear side.

The guide portion 82 is formed such that, in the same manner as in the guide portion 42 on the side of the main portion 22, a belt insertion hole 86 passing through in the front and rear directions with an inclination in a specific direction is formed to allow the seat belt 20 to pass therethrough. The guide portion 82, in the same manner as described with reference to FIGS. 4(A)–4(D), also has a separate structure so that the seat belt 20 can be easily set thereto.

The slide portion 84 has a substantially flat board shape extending in the front and rear directions and a length wherein the entire slide portion 84 can be inserted into the hanger guide portion 67 of the main portion 22. The slide portion 84, also, has a slide hole 88 of a specific length along the extending direction of the slide portion 84. The slide hole 88 has a hole width slightly wider than an outer diameter dimension of the cylindrical portion 74 provided to the spacer 36 and the width of the lower flanges 80, so that the cylindrical portion 74 and the lower flange 80 can be inserted into or extracted from the slide hole.

In case the hanger 24 is assembled to the main portion 22, the orientations of the lower flanges 80 are set to the slide hole 88, and the cylindrical portion 74 and the lower flanges 80 of the spacer 36 are inserted into the slide hole 88 from the upper side for allowing the lower surface of the upper flange 76 to abut against the upper surface of the slide portion 84. Then, the spacer 36 is rotated by about 90° with respect to the sliding hole 88 so that the slide hole 88, i.e. slide portion 84, is positioned between the upper flange 76 and the lower flanges 80, and the spacer 36 can not be extracted from the slide hole 88 by being sandwiched between both the flanges.

Under the engagement state, while inserting the cylindrical portion 74 of the spacer 36 into the spring 38, the lower flanges 80 are fitted into the step portions 72C; the slide portion 84 is set at guide portion 67; the upper cover 32 is placed over the lower cover 30 to thereby obtain the assembled state as shown in FIGS. 6 and 7. Also, under the assembled state, the forward end of the cylindrical portion 74 abuts against a bottom wall surface of the depressed portion 72 of the boss portion 70; the rib 78 of the upper flange 76 contacts a rib 90 formed on the side peripheral edge of the inner wall surface of the circular hole 44 of the upper cover 32, so that the wobbling in the vertical direction of the spacer 36 can be suppressed. Further, the movable end 38B of the spring 38 abuts against the hole wall surface of the slide hole 88 to thereby urge the slide portion 84 in an arrow direction in FIG. 11.

Thus, the hanger 24 can be moved in the front and rear direction since the slide hole 88 is gilded by the spacer 36, and the slide portion 84 slidably contacts the upper flange 76 and the lower flange 80. Also, depressed portions 88A, 88B formed by depressing the hole wall surface are provided at specific positions at the front end and rear end portions of the slide hole 88, and when the hanger 24 is slid in the front or rear direction and reaches a specific position, the movable end 38B of the spring 38 engages the depressed portion 88A or the depressed portion 88B.

Figure 8:
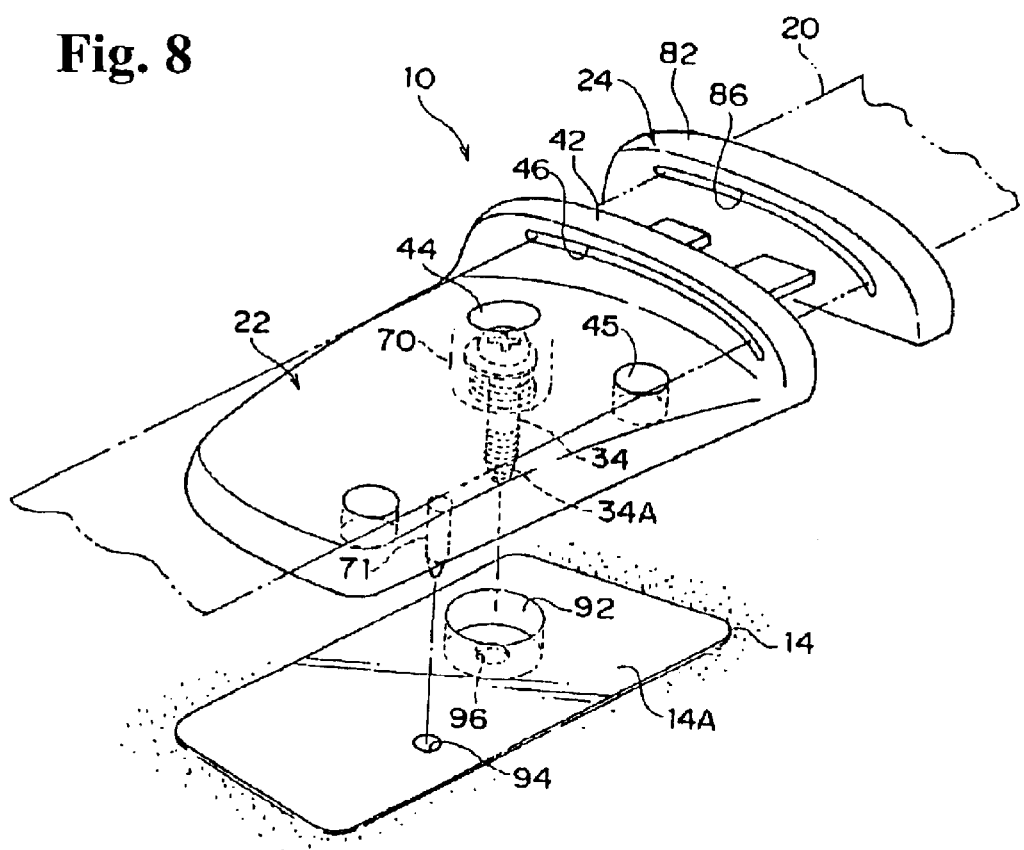
FIG. 8 is a perspective view showing a state where the seat belt guide as shown in FIG. 2 is attached to a seat back.

FIG. 8 is a perspective view showing a state wherein a seat belt guide 10 is attached to an upper portion of a seat back 14 of a rear seat 12. In case the seat belt guide 10 is attached to the seat back 14, the boss portion 70 and the positioning pin 71 provided on the lower surface of the main portion 22 are fitted or inserted into a circular depressed portion 92 and a positioning hole 94 of an attaching surface 14A for setting. Then, the tapping screw 34 is inserted into the spacer 36 through the circular hole 44, and the screw portion 34A at the forward end is screwed into a through-hole 96 on a bottom surface of the circular depressed portion 92 to be fixed.

Next, operation of the present embodiment will be explained. FIGS. 9 to 12 show a state wherein the hanger 24 of the seat belt guide 10 is drawn out for changing the guide position of the seat belt 20.

FIGS. 5 and 7 show a case that the seat belt guide 10 is normally used, wherein the guide portion 82 of the hanger 24 is pushed in to thereby abut against the guide portion 42 of the main portion 22. Under the state, the slide portion 84 is housed in the hanger guide portion 67 of the main portion 22, and also, the rear end portion of the slide portion 84 runs onto the inclined portion 66 to cause a friction force. The depressed portion 88A positioned at the forward end of the slide hole 88 engages the movable end 38B of the spring 38.

Thus, the hanger 24 is held at the position so that it does not easily slide forward and the seat belt 20 inserted into the belt insertion hole 86 is guided at the normal position.

Figure 9:
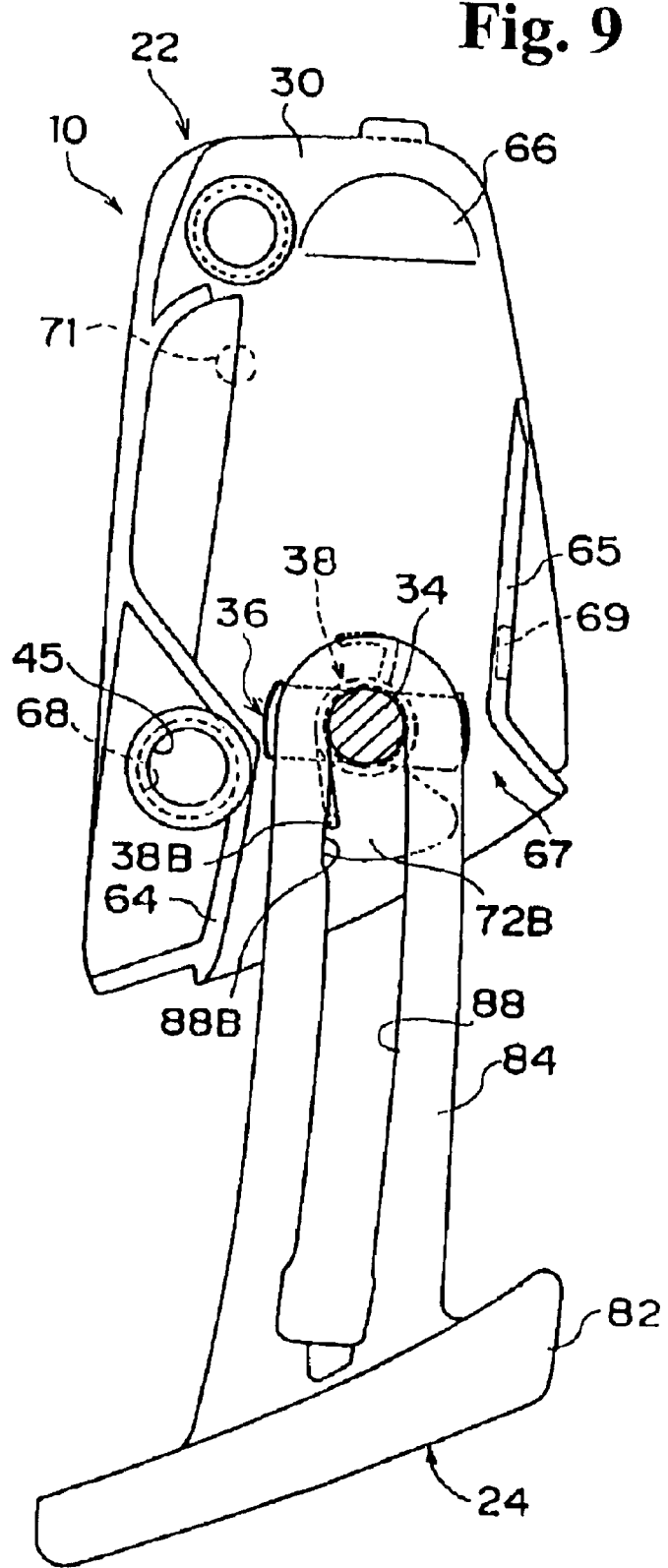
FIG. 9 is a plan sectional view, showing a state where the hanger is drawn forward, for explaining a state where a guide position of the seat belt guide is changed by a sliding movement of the hanger.
Figure 10:
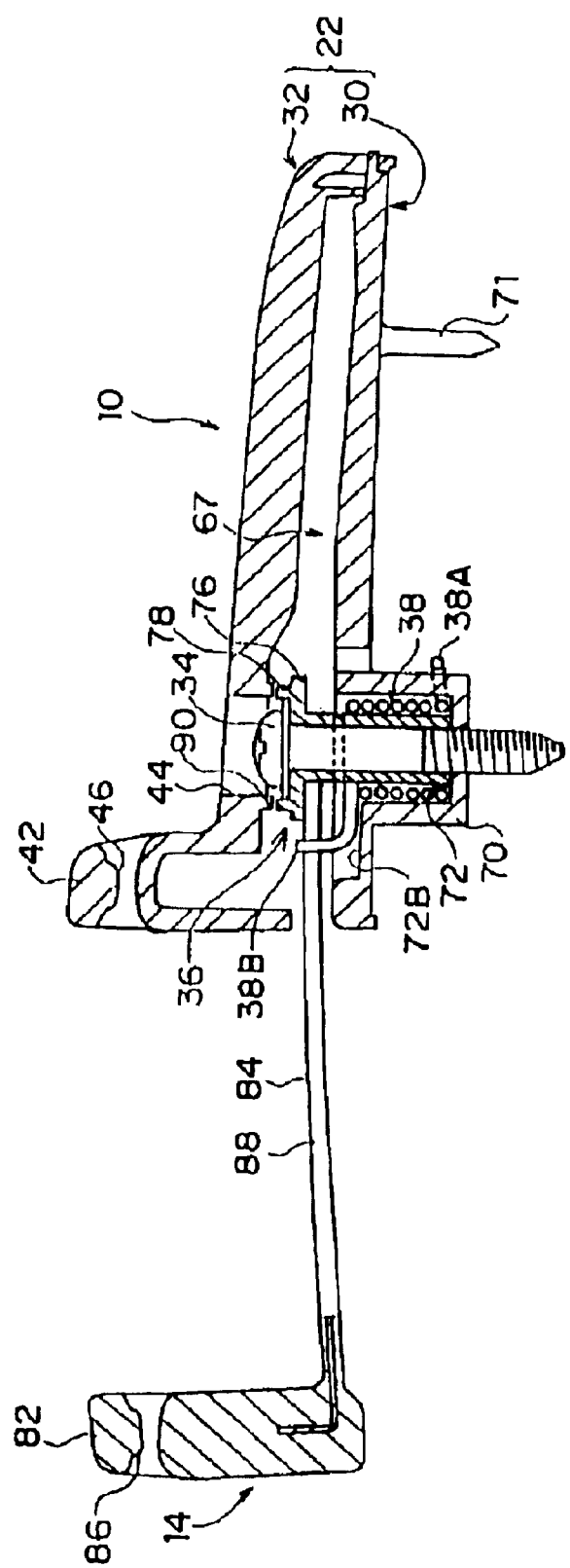
FIG. 10 is a side sectional view of FIG. 9.

When the hanger 24 is drawn out from the position, the slide portion 84 is slid forward in the hanger guide portion 67 while the slide hole 88 is being guided by the spacer 36. When the rear end of the slide hole 88 abuts against the spacer 36 to reach a position as shown in FIGS. 9 and 10, the movable end 38B of the spring 38 is engaged with the depressed portion 88B disposed on the rear end side of the slide hole 88 to thereby lock the hanger 24.

Figure 11:
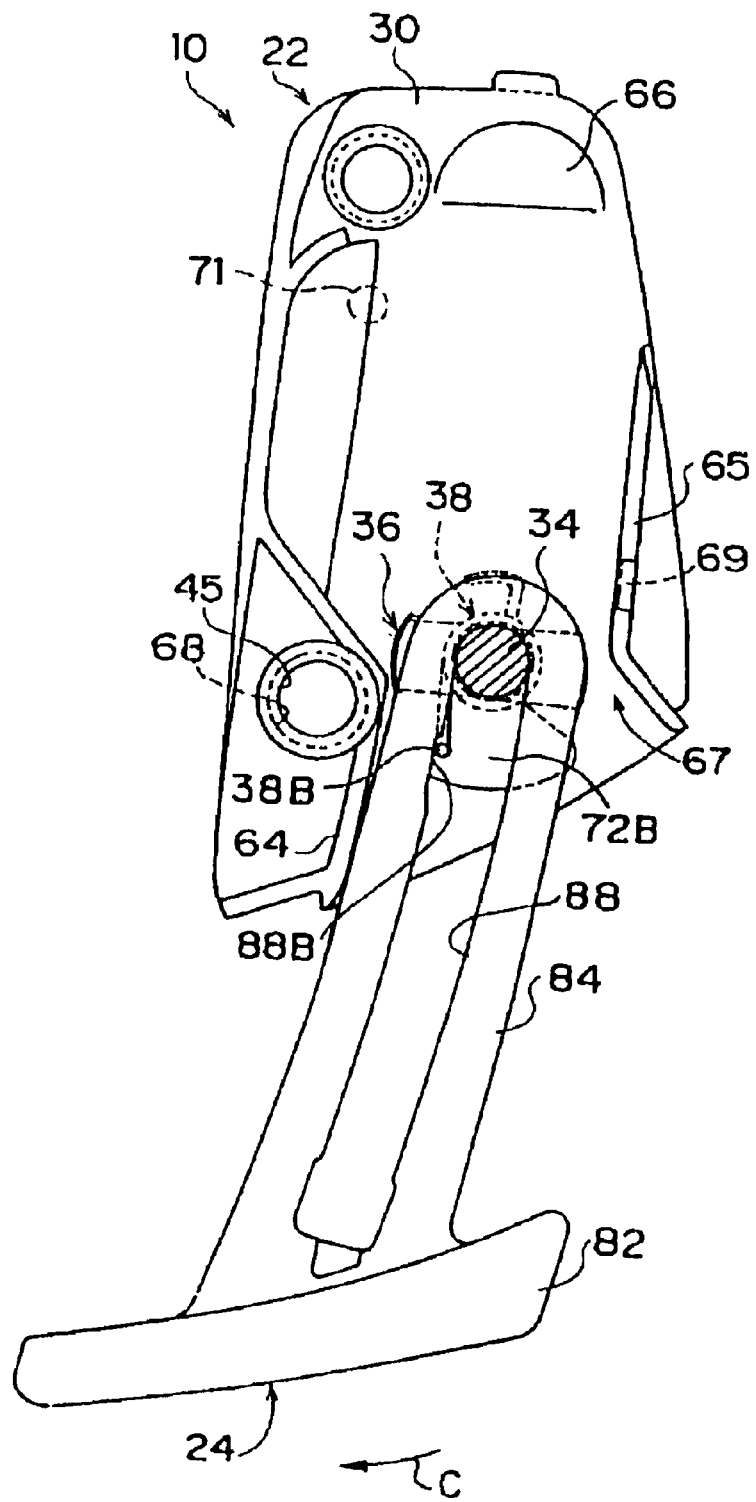
FIG. 11 is a plan sectional view showing a state where the hanger is urged in a specific direction to be swung from the state as shown in FIG. 9, for explaining a state where the guide position of the seat belt is changed by the swinging movement of the hanger.

When a passenger leaves his hand from the hanger 24, the hanger 24 urged by the spring 38 is swung in an arrow C direction shown in FIG. 11, and is fixed to a position where the slide portion 84 abuts against the wall portion 64. Thus, the guide position of the seat belt 20 is changed to a position as shown in FIG. 1.

Figure 12:
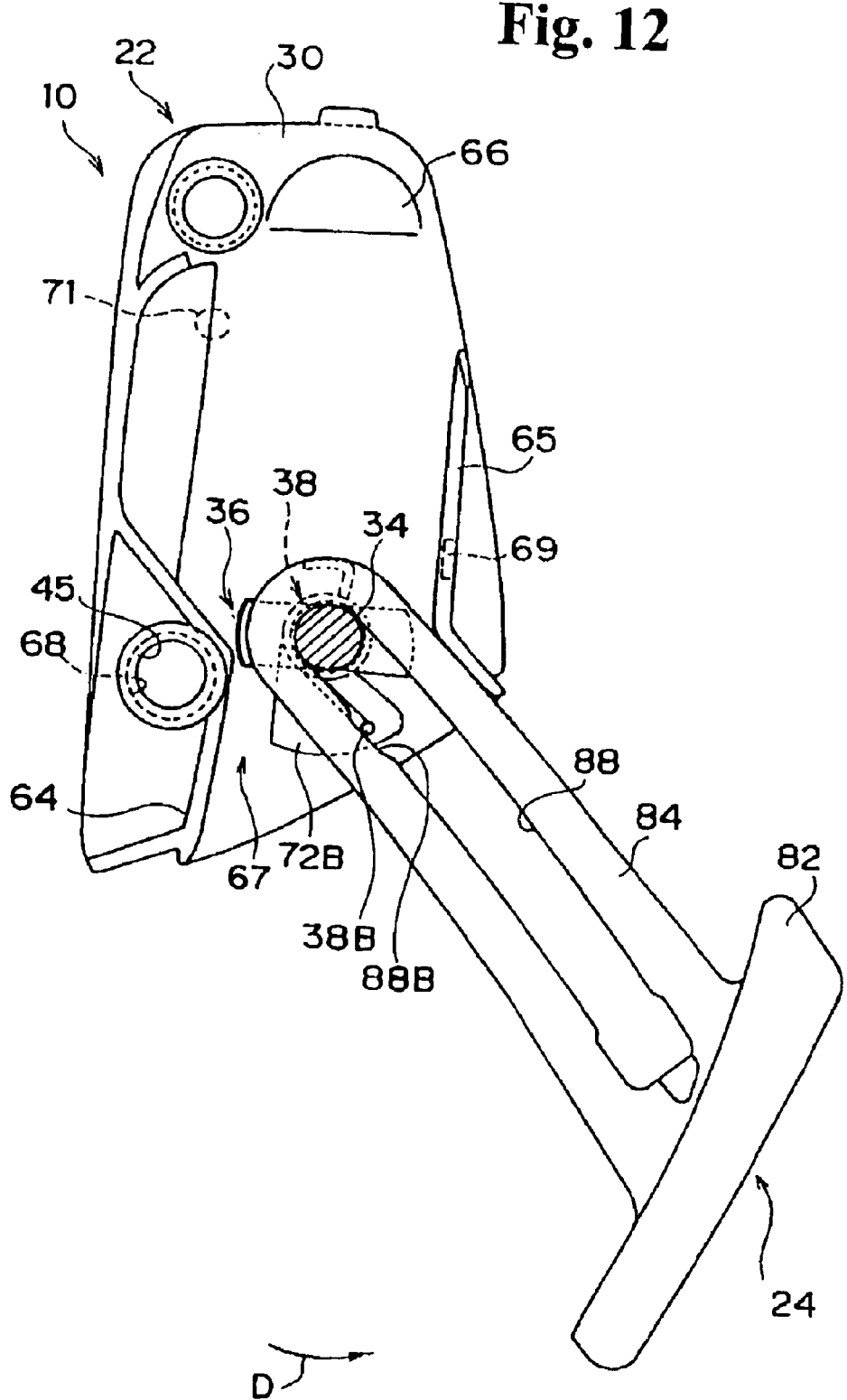
FIG. 12 is a plan sectional view showing a state where the hanger drawn forward is swung to an attaching direction of the seat belt, for explaining a state where the guide position of the seat belt is changed by the swinging movement of the hanger.
Figure 13:
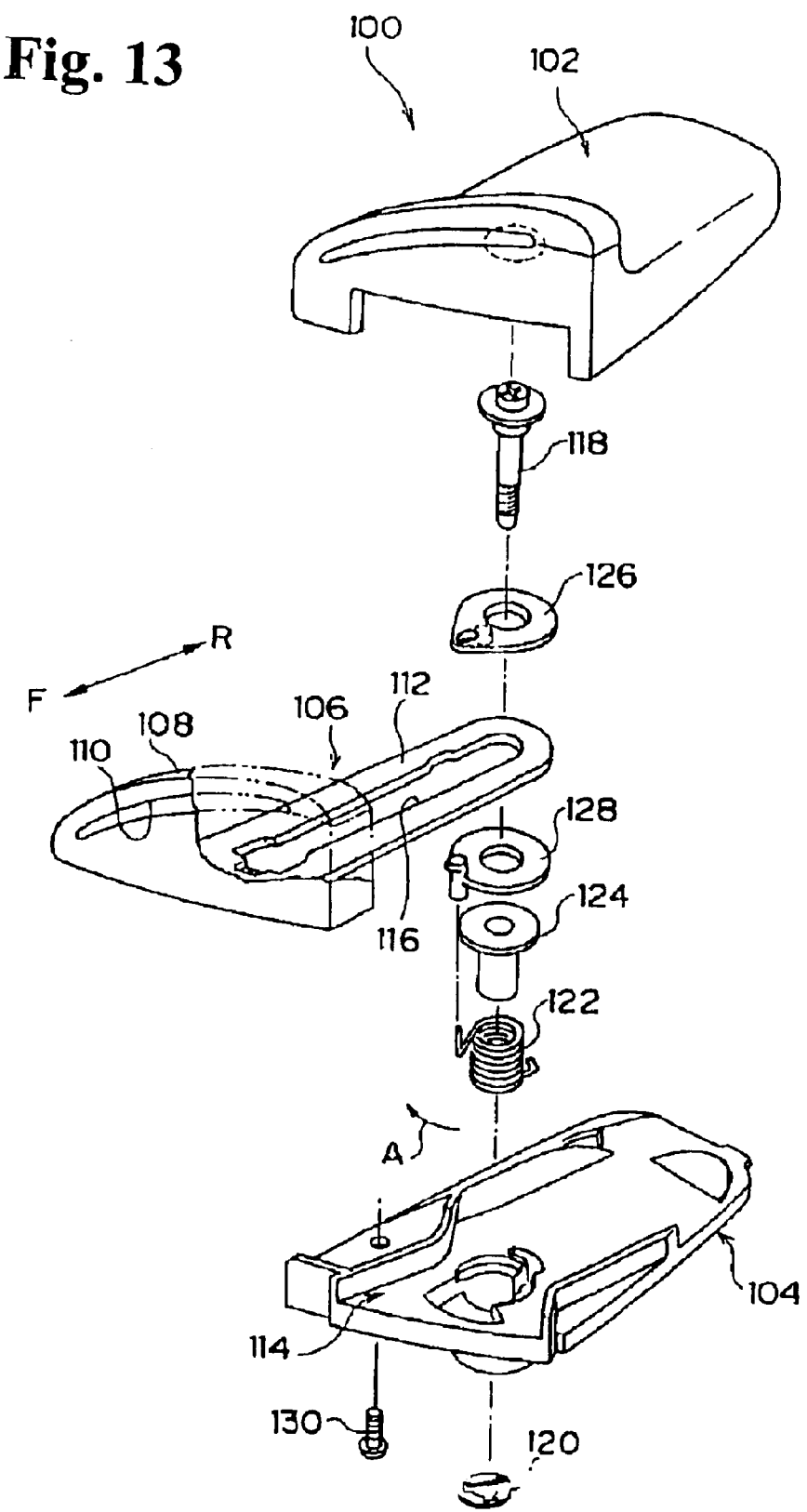
FIG. 13 is an exploded perspective view of a former seat belt guide.

In case the hanger 24 is located at the position as shown in FIG. 11 and the seat belt 20 is pulled strongly, the hanger 24 is swung in an arrow D direction as shown in FIG. 12 to absorb the forces applied to the respective portions of the seat belt guide 10. Thus, it is possible to prevent the seat belt guide 10 from being damaged.

As described hereinabove, in the seat belt guide 10 of the present embodiment according to the invention, the hanger 24 for guiding the upper end portion 20A, i.e. near the shoulder of a passenger 26, of the seat belt 20 can be moved in the front and rear directions of the seat back 14 to thereby change the guide position. Moreover, when the hanger 24 is slid forward by a specific distance, the rear end portion of the slide hole 88 is engaged with the spacer 36, so that the hanger 24 can swing in the horizontal direction. When the seat belt 20 is worn, the hanger 24 is urged by the spring 38 on a substantially opposite side to the direction in which the seat belt 20 is taken out from the belt insertion hole 86. Thus, even if the seat belt is attached to the small passenger 26, there is no such a case that the seat belt 20 winds around the shoulder of the passenger, and the seat belt 20, the attaching height of which is lowered, can be located to a proper position of the passenger.

Also, the spacer 36 is inserted into the slide hole 88 to act as a stopper, and the hanger 24 can be moved along the slide hole 88 guided by the upper flange 76 and the lower flanges 80 of the spacer 36. With the spacer 36 integrally formed with the flanges, the hanger 24 can be guided and supported, so that the structure of the hanger 24 can be simplified and the number of parts can be reduced. Therefore, the production cost thereof can be reduced as well as assembling work can be improved.

In the embodiment according to the present invention, since the spacer 36 is formed as a cylindrical member with a simple structure such that only the tapping screw 34 is inserted thereinto, the seat belt guide 10 provided with the spacer 36 can be fixed to the seat back 14. Therefore, as in the conventional seat belt guide, an exclusive shoulder bolt for fixing plural parts is not required to thereby reduce the cost.

Further, in the present embodiment, since the width of the lower flanges 80 of the spacer 36 is made smaller than the hole width of the slide hole 88 of the hanger 24, the spacer 36 can be easily assembled to the hanger 24 by fitting the lower flanges 80 to the slide hole 88.

Also, in the present embodiment, when the upper cover 32 and the lower cover 30 for constituting the main portion 22 of the seat belt guide 10 are assembled together, since the claw member 62 integrally formed with the upper cover 32 and the claw member 60 of the box anchor 45 are engaged with the depressed portion 69 and the through hole 68 provided to the lower cover 30, respectively, the assembling work of both cover members becomes simple.

Incidentally, the spacer 36 of the present embodiment is made as a cylindrical member since it acts as a supporting shaft when the hanger 24 is swung. However, the other shape, such as columnar shape with edges, which does not swing, may be employed. Also, the spacer 36 has a structure formed of two flanges, between which the slide portion 84 of the hanger 24 is disposed, to thereby prevent the hanger 24 from being extracted or to guide the seat belt in its height direction. However, the number of the flanges which function as a guide is not limited thereto. For example, even if the number of the flange is one, the slide portion 84 may be guided by the flange and the upper or lower cover.

Further, in the present embodiment, although only the lower flanges 80 out of the flanges are formed to be narrower than the slide hole 88, the upper flange 76 may be formed to be narrower, or both of the flanges may be formed to be narrower, than the slide hole 88. In that case, since the spacer 36 can be attached to or removed from the slide hole 88 from both upper and lower sides to thereby easily conduct the assembling work.

Since the seat belt guide according to the present invention has the structure as described above, the number of parts of the structure capable of adjusting the seat belt attaching position can be reduced to thereby decrease the cost of the product, and also, the assembling workability can be improved.

While the invention has been explained with reference to the specific embodiments of the invention, the explanation is illustrative and the invention is limited only by the appended claims.

What is claimed is:

1. A seat belt guide for guiding a seat belt, comprising:

a fixed main portion including two separated cover members, one of said cover members having a first engaging portion integrally formed therewith, and the other of said cover members having a second engaging portion integrally formed therewith, said first and second engaging portions engaging with each other in an assembled state of the cover members, a moving member slidably attached to the main portion to have guide positions in front and rear directions relative to a seat, said moving member having a slide hole therein extending in the front and rear directions; and a supporting member passing through the slide hole to be attached to the seat, said supporting member having a plurality of flanges integrally formed therewith to act as a stopper with respect to the slide hole.

2. A seat belt guide as claimed in claim 1, wherein said supporting member has a cylindrical shape to be fixed to the seat by a tapping screw.

3. A seat belt guide as claimed in claim 2, wherein at least one of said flanges has two flange portions positioned on two sides of the slide hole having a width smaller than that of the slide hole.

4. A seat belt guide as claimed in claim 3, wherein said flanges include an upper flange located on the moving member, and lower flanges situated under the upper flange to have a space therebetween, said moving member being located between the upper and lower flanges.

5. A seat belt guide as claimed in claim 4, wherein said main portion includes a boss portion projecting downwardly therefrom, said supporting member being located in the boss portion.

* * * * *